(12) United States Patent
Brew et al.

(10) Patent No.: US 10,135,850 B2
(45) Date of Patent: Nov. 20, 2018

(54) DATA RESOURCE ANOMALY DETECTION

(71) Applicant: International Business Machines Corporation, Armonk, NY (US)

(72) Inventors: Anthony T. Brew, Dublin (IE); Jonathan I. Settle, London (GB); Vinh Tuan Thai, Cork (IE)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 14/546,336

(22) Filed: Nov. 18, 2014

(65) Prior Publication Data
US 2016/0142430 A1    May 19, 2016

(51) Int. Cl.
*G06F 17/30*  (2006.01)
*H04L 29/06*  (2006.01)

(52) U.S. Cl.
CPC .... *H04L 63/1425* (2013.01); *G06F 17/30722* (2013.01)

(58) Field of Classification Search
CPC .............. G06F 17/30722; H04L 63/1425
See application file for complete search history.

(56) References Cited

U.S. PATENT DOCUMENTS

| | | | |
|---|---|---|---|
| 6,633,742 B1 | 10/2003 | Turner et al. | |
| 7,310,590 B1 * | 12/2007 | Bansal | G06F 11/0751 |
| | | | 702/181 |
| 7,565,268 B2 | 7/2009 | Smith et al. | |
| 7,624,341 B2 | 11/2009 | Salmon et al. | |
| 8,239,227 B2 | 8/2012 | Megiddo et al. | |
| 8,578,260 B2 | 11/2013 | Mayor | |
| 2008/0082908 A1 | 4/2008 | MacGregor | |
| 2008/0249815 A1 | 10/2008 | Helal | |
| 2011/0119226 A1 * | 5/2011 | Ruhl | G06F 17/3089 |
| | | | 706/52 |
| 2012/0030191 A1 | 2/2012 | Zwicky et al. | |

OTHER PUBLICATIONS

Eskin, A Geometric Framework for Unsupervised Anomaly Detection, Detecting Intrusions in Unlabeled Data, 2002, pp. 78-101.*
Chebrolu, Feature deduction and ensemble design of intrusion detection systems, pp. 295-307. (Year: 2005).*
Boyle et al., "Metadoc: An Adaptive Hypertext Reading System", User Modeling and User-Adapted Interaction 4: 1-19, 1994, @ 1994 Kluwer Academic Publishers. Printed in the Netherlands, pp. 1-19.

(Continued)

*Primary Examiner* — Albert M Phillips, III
(74) *Attorney, Agent, or Firm* — Gilbert Harmon, Jr.

(57) ABSTRACT

Anomaly detection is provided. A first component of a first data resource of a plurality of data resources is identified. Each data resource of the plurality of data resources includes one or more components. A score of the first component is determined based, at least in part, on underlying data of the first component and underlying data of one or more other components of data resources of the plurality of data resources that correspond to the first component. An interest level of the first data resource is determined. A relationship between the score of the first component and the interest level of the first data resource is modeled.

12 Claims, 5 Drawing Sheets

(56) References Cited

OTHER PUBLICATIONS

Hohl et al., "Hypadapter: An Adaptive Hypertext System for Exploratory Learning and Programming", User Modeling and User-Adapted Interaction 6: 131-156, 1996., @ 1996 Kluwer Academic Publishers. Printed in the Netherlands, pp. 131-156.
Horvitz Eric, "Principles of Mixed-Initiative User Interfaces", provided in the Main Idea dated Aug. 7, 2014, 9 pages.
Thakkar et al., "Retrieving Relevant Reports from a Customer Engagement Repository", 978-1-4244-2614-0/08, @ 2008 IEEE, pp. 117-126, IEEE International Conference on Software Maintenance, 2008. ICSM 2008, DOI: 10.1109/ICSM.2008.4658060, Publication Year: 2008.
Brew et al., "Data Resource Anomaly Detection", U.S. Appl. No. 14/930,779, 25 pages, filed Nov. 3, 2015.
Appendix P, List of IBM Patents or Patent Applications Treated as Related, 2 pages, dated Nov. 3, 2015.

\* cited by examiner

DATA RESOURCE ANOMALY DETECTION

BACKGROUND OF THE INVENTION

The present invention relates generally to the field of data mining and more specifically to analysis of resources within a data set.

A data set is a collection of data resources. A data resource may include one or more graphs, charts, diagrams, text portions, images, videos, or other organized portions of data. Each such portion of data can be described as a component within a data resource of the data set. Large quantities of data resources are often organized into one or more data sets. Big data is a term used to describe a quantity of data resources so large that that processing, analysis, or using the data resources is difficult. Big data is difficult to work with and limitations arise (e.g., for scientists and researchers) due to the amount of data. These limitations can also affect, for example, internet searching and business analytics. Data mining is often used to mitigate these limitations. Data mining uses information about data resources within a data set to understand the structure of the data set and discover patterns therein.

Current data mining systems can use data resource metadata in determining the structure and patterns of a data set. The metadata of the data resource is data about the information contained in the resource (e.g., that it is a chart about bike sales, or a graph about the weather). A data resource can include one or more distinct pieces of metadata, each of which describes one or more components of the data resource. A piece of metadata corresponds to each component that the metadata describes. Current data mining systems often rank data resources based on the data resource metadata.

SUMMARY

According to one embodiment of the present disclosure, a method for anomaly detection is provided. The method includes identifying, by one or more processors, a first component of a first data resource of a plurality of data resources, wherein each data resource of the plurality of data resources includes one or more components; determining, by one or more processors, a score of the first component based, at least in part, on underlying data of the first component and underlying data of one or more other components of data resources of the plurality of data resources that correspond to the first component; determining, by one or more processors, an interest level of the first data resource; and modeling, by one or more processors, a relationship between the score of the first component and the interest level of the first data resource.

According to another embodiment of the present disclosure, a computer program product for anomaly detection is provided. The computer program product comprises a computer readable storage medium and program instructions stored on the computer readable storage medium. The program instructions include program instructions to identify a first component of a first data resource of a plurality of data resources, wherein each data resource of the plurality of data resources includes one or more components; program instructions to determine a score of the first component based, at least in part, on underlying data of the first component and underlying data of one or more other components of data resources of the plurality of data resources that correspond to the first component; program instructions to determine an interest level of the first data resource; and program instructions to model a relationship between the score of the first component and the interest level of the first data resource.

According to another embodiment of the present disclosure, a computer system for anomaly detection is provided. The computer system includes one or more computer processors, one or more computer readable storage media, and program instructions stored on the computer readable storage media for execution by at least one of the one or more processors. The program instructions include program instructions to identify a first component of a first data resource of a plurality of data resources, wherein each data resource of the plurality of data resources includes one or more components; program instructions to determine a score of the first component based, at least in part, on underlying data of the first component and underlying data of one or more other components of data resources of the plurality of data resources that correspond to the first component; program instructions to determine an interest level of the first data resource; and program instructions to model a relationship between the score of the first component and the interest level of the first data resource.

DETAILED DESCRIPTION

A data resource contains one or more components, each of which corresponds to metadata that describes the characteristics and content of the component. A component is, for example, a graph, chart, or portion of text. Data mining systems catalog metadata of one or more data resources. Embodiments of the present invention recognize that current data mining systems rank and organize data resources based on the data resource metadata. Embodiments of the present invention provide for ranking or categorizing a data resource based on a data resource score, which is an aggregation of one or more component sub-scores of the data resource. Each component score reflects the importance of a component to a user. Thus, the data resource score represents the importance of the data resource to a user. The subset of data resource metadata is the basis for the data resource rank and is likely more relevant to a user. Embodiments of the present invention provide for highlighting, exposing, or otherwise indicating one or more components of a data resource.

Figure 1:
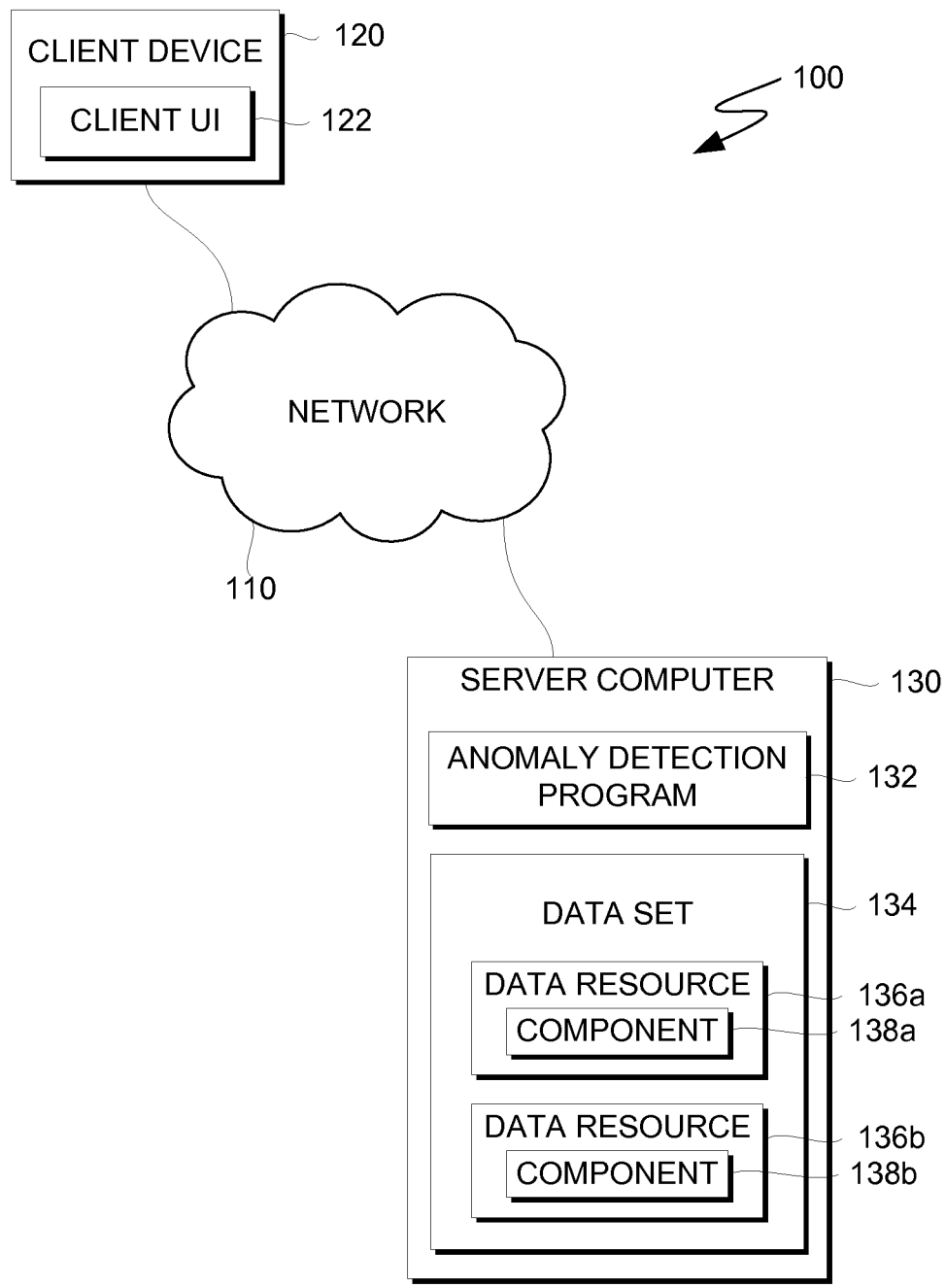
FIG. 1 is a functional block diagram illustrating a computing environment, in accordance with an embodiment of the present invention.

The present invention will now be described in detail with reference to the Figures. FIG. 1 is a functional block diagram illustrating a computing environment, generally designated 100, in accordance with one embodiment of the present invention. Computing environment 100 includes client device 120 and server computer 130 interconnected over network 110. Network 110 may be a local area network (LAN), a wide area network (WAN) such as the Internet, any combination thereof, or any combination of connections and protocols that will support communications between client device 120 and server computer 130 in accordance with embodiments of the present invention. Network 110 may include connections such as wired, wireless, communication links, or fiber optic cables. Computing environment 100 may include additional servers, clients, and other devices not illustrated.

Server computer 130 may be a management server, a web server, or any other electronic device or computing system capable of processing program instructions and receiving and sending data. In some embodiments, server computer 130 may be a laptop computer, tablet computer, personal computer (PC), desktop computer, or any programmable electronic device capable of communicating with client device 120 via network 110. In other embodiments, server computer 130 represents a computing system utilizing multiple computers as a server system, such as in a cloud computing environment. In another embodiment, server computer 130 represents a computing system utilizing clustered computer and components to act as a single pool of seamless resources. Server computer 130 includes data set 134, which includes one or more data resources (e.g., data resource 136a, data resource 136b), collectively referred to as data resources 136. Each of data resources 136 includes one or more components (e.g., component 138a and component 138b), collectively referred to as components 138. In other embodiments, server computer 130 may include internal and external hardware components, as depicted and described in further detail with respect to FIG. 5.

Data set 134 may be any collection, storage, or repository of data resources like data resources 136. In some embodiments, data set 134 collects and stores data resources like data resources 136. As illustrated in FIG. 1, data set 134 may be located within server computer 130. In other embodiments, data set 134 may be located on another computing device (e.g., client device 120) or may be a separate device, as long as data set 134 is accessible by server computer 130. In some embodiments, data set 134 may be written to and read by programs and entities outside of computing environment 100, for example, in order to populate the repository with data resources 136. FIG. 1 is intended merely as one example and not as an architectural limitation for the present invention.

Each of data resources 136 is an organized body of data that includes one or more components 138. In one embodiment, each of data resources 136 is a report generated by a big data analytics system. In other embodiments, each of data resources 136 may be a web page, image, video, or other organized portion of data or content accessible (e.g., via network 110) to computing devices (e.g., server computer 130, client device 120). Each component 138 may be a graph, chart, diagram, text block, image, video, or other organized portion of data. Each of data resources 136 may have multiple components 138. Data set 134 may include large quantities of data resources 136, each having one or more components 138. Data set 134 may represent a plurality of data sets, each having one or more data resources 136 that each, in turn, have one or more components 138.

Figure 4:
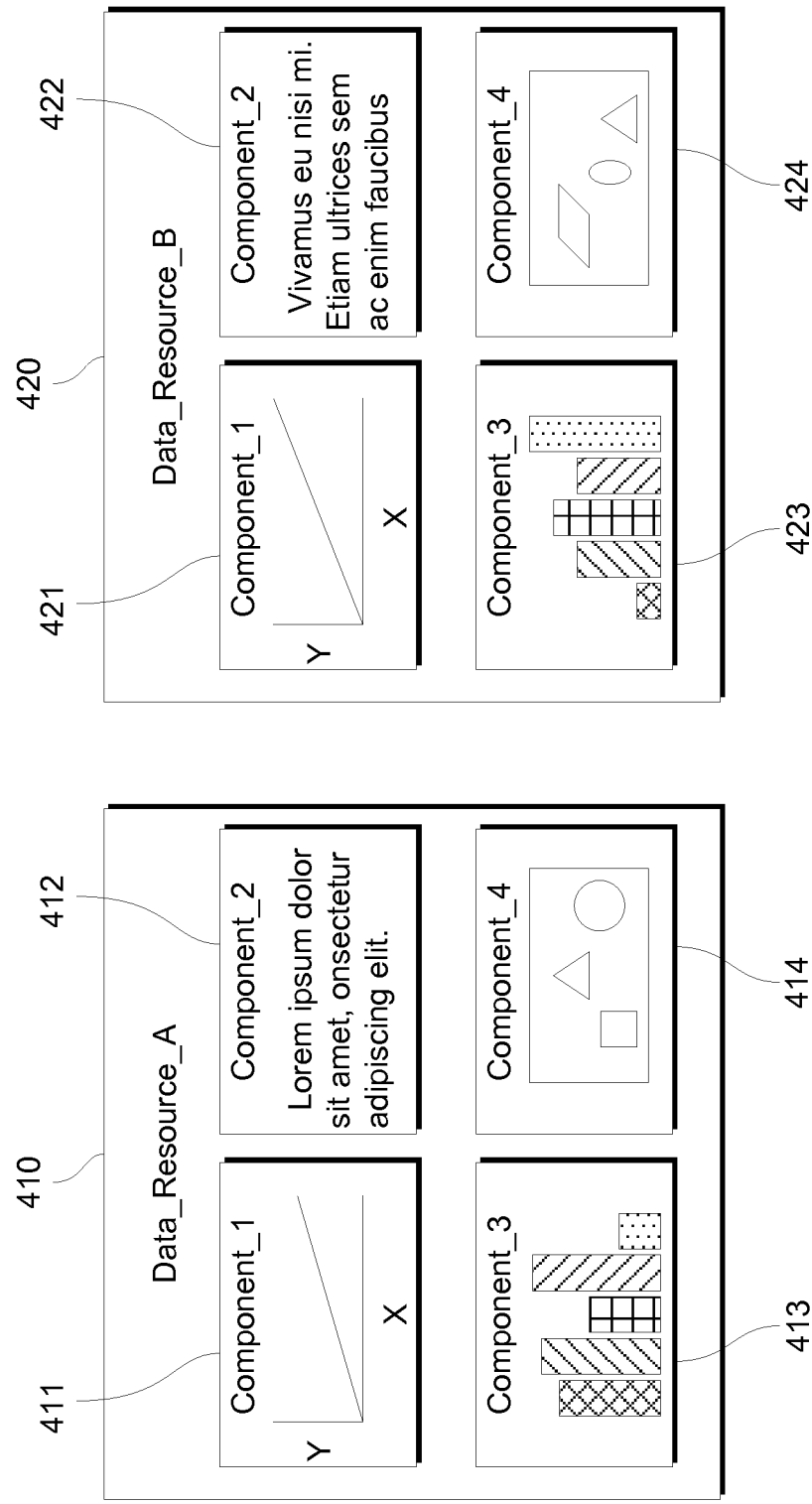
FIG. 4 is a block diagram depicting an example implementation of data resources and components, in accordance with an embodiment of the present invention.

An example of data resources having multiple components is depicted in FIG. 4, in which data resource 410 has components 411, 412, 413, and 414, and data resource 420 has components 421, 422, 423, and 424. The components of data resource 410 and data resource 420 correspond to one another. In one embodiment, components are arranged within data resources in a certain order. In this case, each component of a data resource corresponds to the components of other data resources at the same sequential position. For example, each data resource includes an array of components, in which case components of different data resources at the same array index correspond to one another. In the depicted example, components 411, 412, 413, and 414 correspond to components 421, 422, 423, and 424, respectively. In one embodiment, components that correspond to one another pertain to the same subject matter but represent different underlying data. For example, component 413 and component 423 may each include a chart of quarterly sales figures for a given line of products, where each chart reflects data from a different quarter. In another example, component 412 and component 422 may each include a portion of text such as a survey response, in which case the text of the survey response may differ from component 412 to component 422. In another embodiment, a plurality of corresponding components may depict the same underlying data. In one embodiment, corresponding components have the same metadata. In another embodiment, anomaly detection program 132 maps the components of a data resource to index positions based on the metadata of the data resources, such that each component is in the same index position as the components to which it corresponds.

Client device 120 may be, for example, a personal computer, desktop computer, laptop computer, netbook computer, tablet computer, personal digital assistant (PDA), smart phone, or other computation and/or communication device. In general, client device 120 may be an electronic device or computing system capable of processing program instructions and sending and receiving data and communicating with server computer 130 may be any electronic device or computing system capable of processing program instructions and sending and receiving data and communicating with server computer 130 over network 110. Client device 120 may include internal and external hardware components, as depicted and described in further detail with respect to FIG. 5.

Client device 120 includes a user interface (UI), client UI 122, which executes locally on client device 120 and operates to provide a UI to a user of client device 120. Client UI 122 further operates to receive user input from a user via the provided user interface, thereby enabling the user to interact with client device 120. In one embodiment, client UI 122 provides a user interface that enables a user of client device 120 to interact (e.g., via network 110) with anomaly detection program 132 of server computer 130. In one example, client UI 122 presents the user of client device 120 with indicators generated by anomaly detection program 132 to indicate anomalies to the user. In one embodiment, client UI 122 is stored on client device 120. In other embodiments, client UI 122 is stored on another computing device (e.g., server computer 130), provided that client UI 122 can access and is accessible by at least anomaly detection program 132.

Anomaly detection program 132 is stored on server computer 130. In one embodiment, anomaly detection program 132 operates to identify anomalies among data resources (e.g., data resources 136). In another embodiment, anomaly detection program 132 operates to generate indicators for data resources 136, components 138, or both. In various examples, anomaly detection program 132 identifies anomalies in data resources 136, components 138, or both based, at least in part, on anomaly scores of components 138 and, in response, anomaly detection program 132 generates indicators for the data resources 136, components 138, or both for which anomalies were identified. In one embodiment, an indicator adjusts an ordering of presentation of one or more components 138 of a data resource of data resources 136. Alternatively, an indicator identifies, exposes, formats, or otherwise indicates the anomalous data resources 136 and/or components 138 based upon which anomaly detection program 132 detected an anomaly. For example, an indicator may modify the manner in which a data resource (e.g., data resource 136a) is presented to a user (e.g., via client UI 122).

Figure 2:
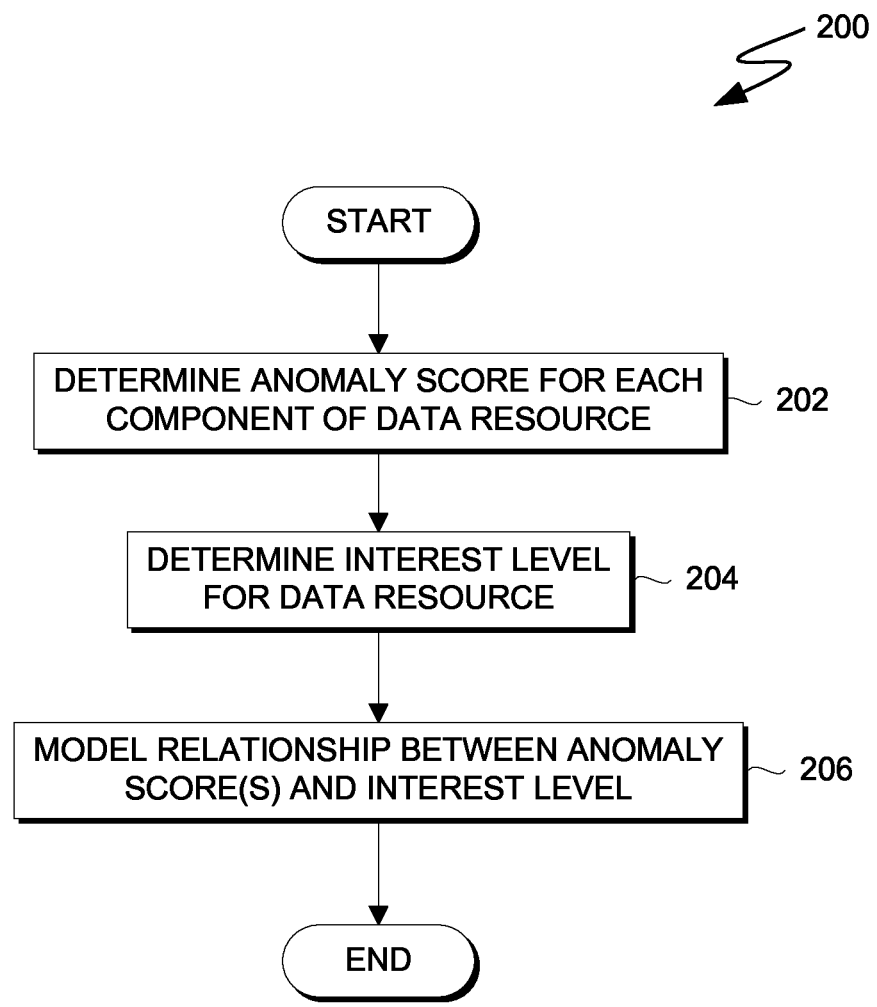
FIG. 2 is a flowchart depicting operations for anomaly detection, on a computing device within the computing environment of FIG. 1, in accordance with an embodiment of the present invention.

FIG. 2 is a flowchart depicting operations for anomaly detection, on a computing device within the computing environment of FIG. 1, in accordance with an embodiment of the present disclosure. For example, FIG. 2 is a flowchart depicting operations 200 of anomaly detection program 132, on server computer 130 within computing environment 100.

In step 202, anomaly detection program 132 determines an anomaly score for each component of a data resource. The anomaly score for a component represents the degree to which the underlying data of the component is unusual or anomalous relative to the components corresponding thereto. In one embodiment, anomaly detection program 132 determines an anomaly score for a component by comparing the component to one or more corresponding components. For example, anomaly detection program 132 compares component 422 to one or more corresponding components, including component 432. In one embodiment, anomaly detection program 132 determines an anomaly score for all components of all data resources by comparing each component to all components corresponding thereto. In this case, each data resource has an anomaly score for each component of the data resource.

In some embodiments, anomaly detection program 132 may determine an anomaly score utilizing a novelty detection technique such as a multivariate Gaussian distribution, k-Nearest Neighbors algorithm, local outlier factor algorithm, cluster analysis, or any combination thereof. Further, such techniques may include unsupervised, semi-supervised, supervised anomaly detection techniques, or any combination thereof.

In step 204, anomaly detection program 132 determines an interest level for a data resource. The interest level for a data resource represents an amount of interest expressed in the data resource. For example, the interest may be expressed explicitly through user interaction or implicitly through user behavior, wherein the user is, for example, a user of server computer 130, a user of client device 120 (e.g., via client UI 122), a user of another computing device, or any combination thereof. In one embodiment, anomaly detection program 132 determines an interest level for a data resource by categorizing the data resource into one of at least two categories. The categories may correspond to uninteresting versus interesting data resources, or to data resources that are of low, medium, or high interest, or to any other categorization of a relative level of interest.

In one embodiment, anomaly detection program 132 determines the interest level of a data resource based on a received interest level for the data resource. For example, anomaly detection program 132 may retrieve the interest level from a database or, alternatively, anomaly detection program 132 may receive the interest level as user input (e.g., via client UI 122). In another embodiment, anomaly detection program 132 determines the interest level for a data resource based on user behavior in connection with the data resource. In this case, the user behavior may include a measure of the amount (e.g., duration, frequency, cumulative count) the user accesses a given data resource or particular components thereof. For example, anomaly detection program 132 determines a high level of interest for a data resource that a user frequently accesses or that a user accesses (e.g., views) for a long period of time. In one embodiment, anomaly detection program 132 determines an interest level for a data resource utilizing logistic regression to categorize the data resource based on the user behavior in connection with the data resource.

In some embodiments, the interest level is a relative measure, in which case anomaly detection program 132 compares the user behavior in connection with each data resource to that in connection with other data resources. In other embodiments, the interest level is an absolute measure, in which case anomaly detection program 132 compares the user behavior in connection with the data resource to one or more predetermined thresholds. In yet another embodiment, the interest level is a combination of a relative measure and an absolute measure.

In step 206, anomaly detection program 132 models a relationship between the anomaly score of each component of a data resource and the interest level of the data resource. The modeled relationship represents a degree of influence of the anomaly score of each component of a data resource on the level of interest of the data resource. In one embodiment, anomaly detection program 132 models the relationship by determining a weight for each component such that the weight-adjusted anomaly score of each component of each data resource predicts the interest level of the data resource when utilizing a discrete classification statistical technique (e.g., logistic regression or naïve Bayes classification). For example, anomaly detection program 132 utilizes a naïve Bayes classification to train feature weights, where the feature is the anomaly score of each component.

Figure 3:
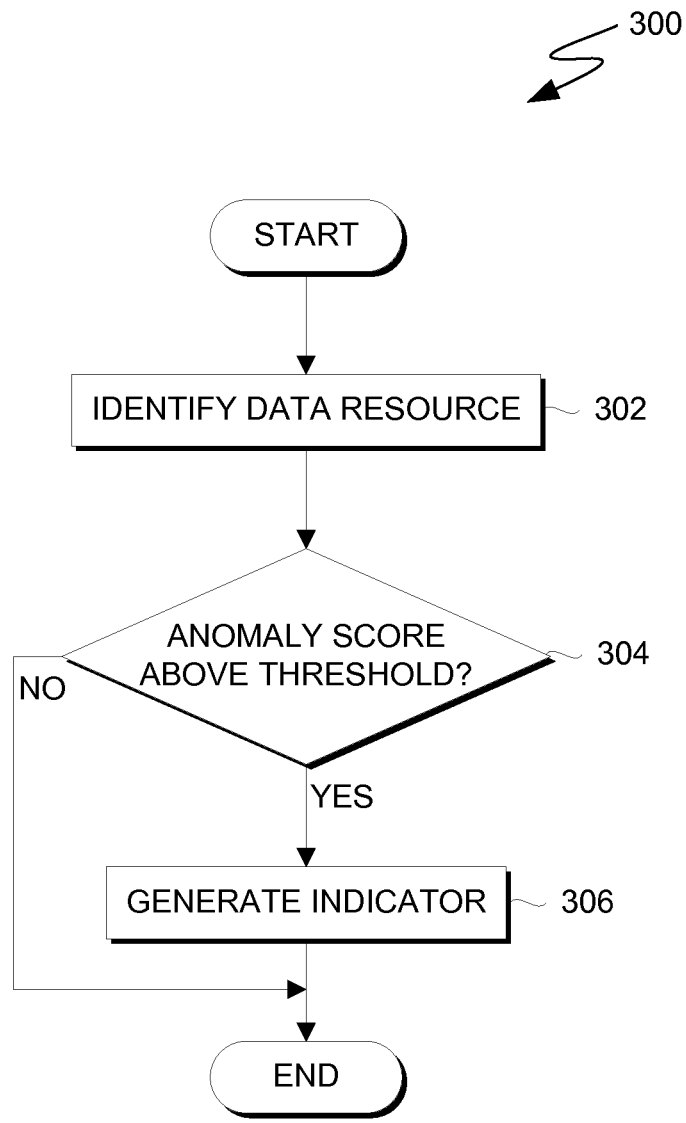
FIG. 3 is a flowchart depicting operations for anomaly detection, on a computing device within the data processing environment of FIG. 1, in accordance with an embodiment of the present invention.

FIG. 3 is a flowchart depicting operations for anomaly detection, on a computing device within the computing environment of FIG. 1, in accordance with an embodiment of the present disclosure. For example, FIG. 3 is a flowchart depicting operations 300 of anomaly detection program 132, on server computer 130 within computing environment 100.

In step 302, anomaly detection program 132 identifies a data resource. In various embodiments, anomaly detection program 132 identifies the data resource by retrieving, receiving, or otherwise obtaining the data resource from server computer 130 (e.g., from data set 134), from client device 120 (e.g., from client UI 122), or from another computing device. The data resource includes components corresponding to the components for which anomaly detection program 132 modeled a relationship (see FIG. 2 and accompanying discussion). In one embodiment, the data resource includes one or more components and an anomaly score for each. In another embodiment, anomaly detection program 132 determines an anomaly score for each component of the identified data resource in a manner substantially similar to the description above in connection with step 202.

In decision 304, anomaly detection program 132 determines whether the anomaly score for a component is above a threshold. In one embodiment, the anomaly score is adjusted by a weight of the modeled relationship (see step 206) for the component. Anomaly detection program 132 performs decision 304 and, if applicable, step 306 for each component of the data resource. If anomaly detection program 132 determines that the anomaly score is above a threshold (decision 304, YES branch), then anomaly detection program 132 generates an indicator (step 306). If anomaly detection program 132 determines that the anomaly score is not above a threshold (decision 304, NO branch), then operations 300 are concluded. In one embodiment, the threshold is a value statistically determined based on the anomaly scores of all components of data resources 136 that correspond to one another. In one example, the threshold is one standard deviation above a mean of the anomaly scores. In yet another example, the threshold is a value exceeded by a certain percentage of anomaly scores. In another embodiment, anomaly detection program 132 determines that the anomaly score for a component is above the threshold if the anomaly score is the highest anomaly score of all components of the data resource. Thus, in this embodiment, anomaly detection program 132 determining whether the anomaly score for a component is above a threshold includes identifying the component of a given data report with the highest anomaly score.

In step 306, anomaly detection program 132 generates an indicator. The indicator modifies the presentation of the identified data resource. In various embodiments, anomaly detection program 132 modifies the presentation of the identified data resource by modifying the data resource, by associating the data resource with presentation modification information, or by superimposing graphics that modify the presentation of the identified data resource at the time of its presentation. In various examples, anomaly detection program 132 modifies the identified data resource with a presentation modifier (e.g., formatting instructions or markup language), associates the data resource with such a presentation modifier, or modifies the presentation of the data resource at the time of its presentation. In one embodiment, the indicator modifies a characteristic of a component (e.g., coloration, borders, shading, font, formatting, typeface, or other characteristic). Such modifications affect any part of the component (underlying data, axes, etc.). In another embodiment, the indicator modifies the presentation of the component by, for example, modifying the layout, order, or sizing of one or more components, or by adding a label to one or more components (e.g., a label that identifies the component with an anomaly score above the threshold). For example, anomaly detection program 132 may generate an indicator for a data resource by modifying the layout and ordering of the components of the data resource in order to present the component having the highest weighted anomaly score first. In this case, anomaly detection program 132 maintains the logical ordering (i.e., index position) of the components in order to preserve the correspondences between the components of the identified data resource with the other data resources 136 of data set 134.

Figure 5:
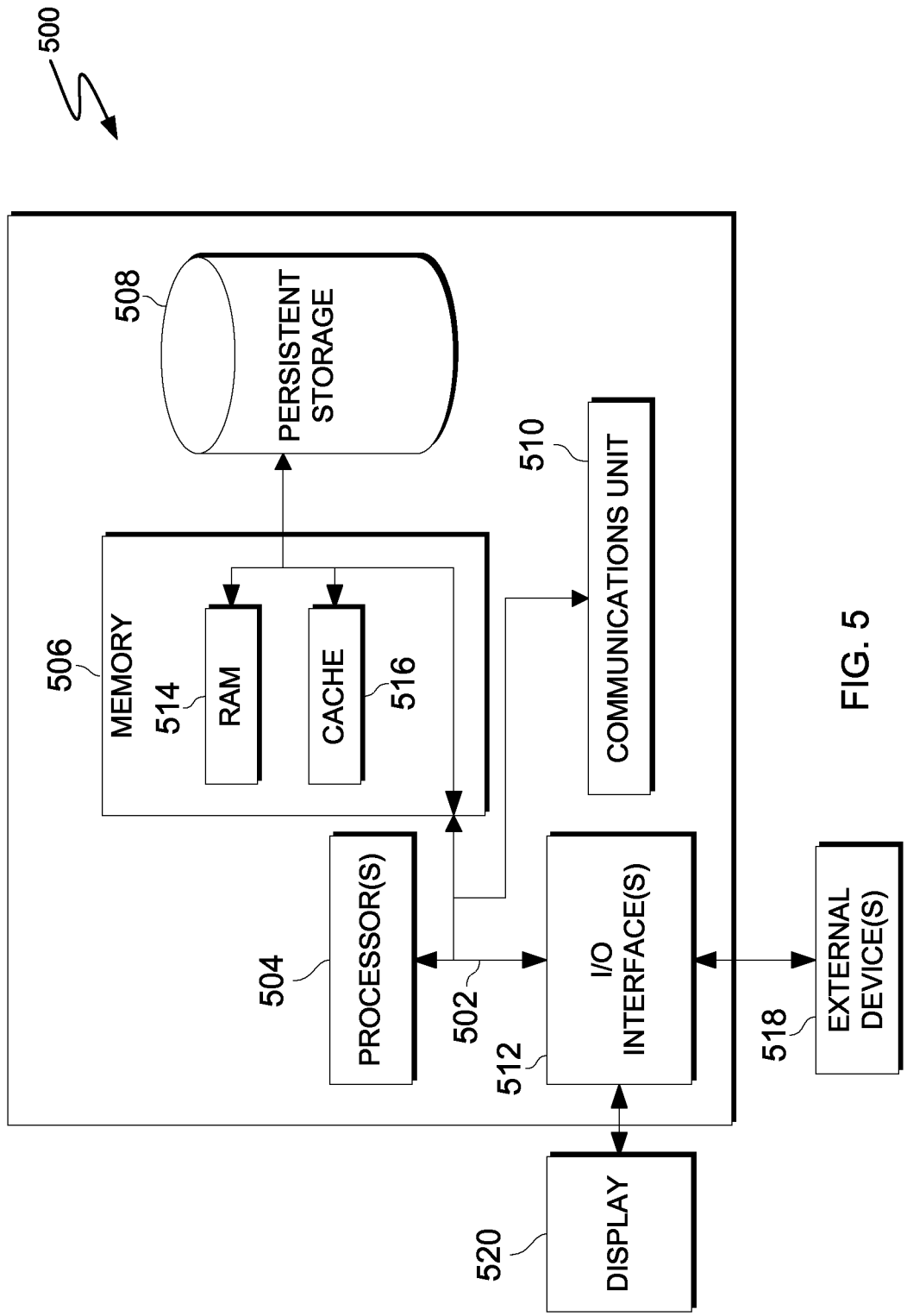
FIG. 5 is a block diagram of components of a computing device executing an anomaly detection program, in accordance with an embodiment of the present invention.

FIG. 5 is a block diagram of components of the computing device executing operations for anomaly detection, in accordance with an embodiment of the present disclosure. For example, FIG. 5 is a block diagram of server computer 130 within computing environment 100 executing operations of anomaly detection program 134.

It should be appreciated that FIG. 5 provides only an illustration of one implementation and does not imply any limitations with regard to the environments in which different embodiments may be implemented. Many modifications to the depicted environment may be made.

Server computer 130 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Each of anomaly detection program 132 and data set 134 is stored in persistent storage 508 for execution and/or access by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices, including resources of network 110. In these examples, communications unit 510 includes one or more network interface cards. Communications unit 510 may provide communications through the use of either or both physical and wireless communications links. Each of anomaly detection program 132 and data set 134 may be downloaded to persistent storage 508 through communications unit 510.

I/O interface(s) 512 allows for input and output of data with other devices that may be connected to server computer 130. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., anomaly detection program 132 and data set 134) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product to improve data mining results analysis based on anomaly detection, the computer program product comprising:
a computer readable storage medium and program instructions stored on the computer readable storage medium, the program instructions comprising:
program instructions to identify a first component of a first data resource of a plurality of data resources, wherein each data resource of the plurality of data resources includes one or more components;
program instructions to determine a score of the first component based, at least in part, on underlying data of the first component and underlying data of one or more other components of data resources of the plurality of data resources that correspond to the first component and on weight-adjusted anomaly scores to train feature weights wherein the feature weights are the anomaly scores of one or more components;
program instructions to determine an interest level of the first data resource, wherein the interest level represents an amount of interest expressed in the data resource based at least on user input;
program instructions to create a model of a relationship between the score of the first component and the interest level of the first data resource based on determining weights for the one or more components wherein weight adjusted anomaly scores of the one or more components predict an interest level of a data resource based on a discrete classification statistical technique;
program instructions to adjust an ordering of a second component associated with a second data resource based on the interest level; and
program instructions to output the second data resource to improve a user review of the second data resource.

2. The computer program product of claim 1, wherein the program instructions further comprise:
program instructions to determine that the one or more other components of data resources of the plurality of data resources correspond to the first component based, at least in part, on a metadata of the first component and a metadata of each of the one or more other components.

3. The computer program product of claim 1, wherein modeling the relationship between the score of the first component and the interest level of the first data resource further comprises determining a weight for the first component such that the interest level is a function of the first component and the weight for the first component.

4. The computer program product of claim 3, wherein the program instructions further comprise:
program instructions to determine that the score for the first component exceeds a threshold; and
program instructions to generate an indicator for the first component, wherein the indicator is a modification to a presentation of the first component.

5. The computer program product of claim 4, wherein determining that the score for the first component exceeds the threshold is based, at least in part, on the weight for the first component.

6. The computer program product of claim 4, wherein the threshold is based, at least in part, on a score of the second component of the first data resources.

7. A computer system to improve data mining results analysis based on anomaly detection, the computer system comprising:
one or more computer processors;
one or more computer readable storage media;
program instructions stored on the computer readable storage media for execution by at least one of the one or more processors, the program instructions comprising:
program instructions to identify a first component of a first data resource of a plurality of data resources, wherein each data resource of the plurality of data resources includes one or more components;
program instructions to determine a score of the first component based, at least in part, on underlying data of the first component and underlying data of one or more other components of data resources of the plurality of data resources that correspond to the first component and on weight-adjusted anomaly scores to train feature weights wherein the feature weights are the anomaly scores of one or more components;
program instructions to determine an interest level of the first data resource, wherein the interest level represents an amount of interest expressed in the data resource based at least on user input;
program instructions to create a model of a relationship between the score of the first component and the interest level of the first data resource based on determining weights for the one or more components wherein weight adjusted anomaly scores of the one or more components predict an interest level of a data resource based on a discrete classification statistical technique;
program instructions to adjust an ordering of a second component associated with a second data resource based on the interest level; and
program instructions to output the second data resource to improve a user review of the second data resource.

8. The computer system of claim 7, wherein the program instructions further comprise:
program instructions to determine that the one or more other components of data resources of the plurality of data resources correspond to the first component based, at least in part, on a metadata of the first component and a metadata of each of the one or more other components.

9. The computer system of claim 7, wherein modeling the relationship between the score of the first component and the interest level of the first data resource further comprises determining a weight for the first component such that the interest level is a function of the first component and the weight for the first component.

10. The computer system of claim 9, wherein the program instructions further comprise:
program instructions to determine that the score for the first component exceeds a threshold; and
program instructions to generate an indicator for the first component, wherein the indicator is a modification to a presentation of the first component.

11. The computer system of claim 10, wherein determining that the score for the first component exceeds the threshold is based, at least in part, on the weight for the first component.

12. The computer system of claim 10, wherein the threshold is based, at least in part, on a score of the second component of the first data resources.

\* \* \* \* \*